United States Patent Office 3,462,348
Patented Aug. 19, 1969

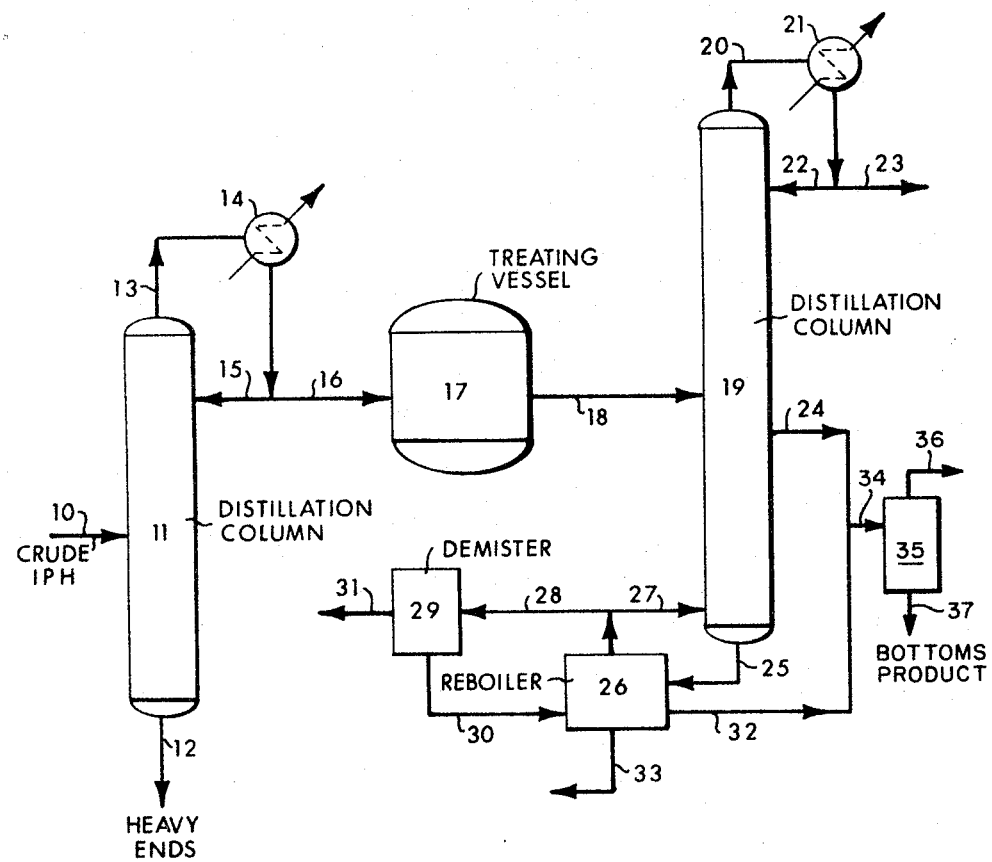

3,462,348
PURIFICATION OF ISOPHORONE BY PLURAL STAGE DISTILLATION
William E. Wellman, Edison, Paul E. Burton, Westfield, and William D. Diana, Somerville, N.J., assignors to Esso Research and Engineering Company, a corporation of Delaware
Filed Mar. 25, 1968, Ser. No. 715,858
Int. Cl. B01d 3/34, 3/06
U.S. Cl. 203—28          14 Claims

ABSTRACT OF THE DISCLOSURE

Isophorone is normally contaminated with various impurities that are difficult to remove. Substantially pure isophorone may be recovered by the distillation of a crude isophorone stream and withdrawal of the pure product at a point below the feed. Isophorone is useful as a solvent for coatings and lacquer.

Field of invention

This invention relates to the purification of isophorone. More particularly, this invention relates to a method for recovering exceedingly high purity isophorone from a distillation tower, the isophorone being recovered from a point below the feed. In another embodiment of this invention, the yield of isophorone may be increased by treating a crude isophorone stream from which the heavy ends have been removed, either thermally or catalytically prior to the final distillation.

Prior art

The preparation of isophorone by the base catalyzed condensation of acetone is a well-known procedure having been described in various patents and publications, e.g., Craven, J. Appl. Chem. 12, pages 120–122 (1962), U.S. Patent 2,566,564, U.S. Patent 2,399,976. The reaction is generally believed to proceed through the formation of diacetone alcohol and mesityl oxide as intermediates. The crude isophorone product from such a process normally contains many impurities, including light ends, phorone, beta-phorone, beta-isophorone, some medium boiling unknowns, and some heavy ends. Typical of the concentration of such impurities would be a crude isophorone product containing a small amount of light ends, 1–4% phorone, 1–2% beta-phorone, 2–6% beta-isophorone, 1–3% medium boiling unknowns, and 15–30% heavy ends. The purification of this crude isophorone product by distillation, however, is complicated by some dynamic chemical equilibria which are constantly shifting during the purification process. It is believed that at least two pair of isomers are involved, as shown below:

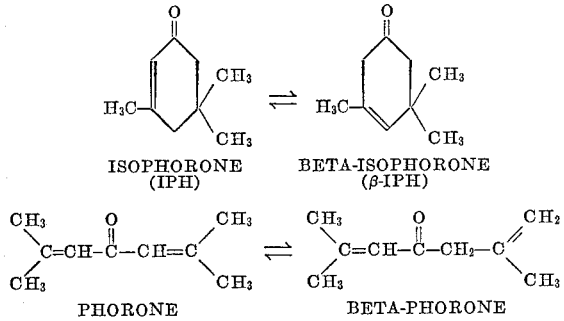

ISOPHORONE (IPH)   BETA-ISOPHORONE (β-IPH)

PHORONE   BETA-PHORONE

At the elevated temperatures required for distillation (either at atmospheric pressure or under a moderate vacuum) the system is in a dynamic equilibrium between the two pairs of isomers. In actual practice, the beta isomers, being lower boiling, are preferentially removed overhead. The residue, however, then reequilibrates thus forming additional beta isomer which is again preferentially removed. The net result of such a process is an enrichment of the beta isomer in the overhead product. Consequently, the recovery of a substantially pure isophorone product is quite difficult.

Moreover, the isophorone-beta-isophorone equilibrium also makes the removal of phorone more difficult. Thus, the four key components in the purification, listed in order of increasing boiling points, are: beta-phorone (183° C.), beta-isophorone (186° C.), phorone (200° C.), and isophorone (215° C.). The equilibrium which converts the isophorone to its beta isomer, which boils lower than phorone, is harmful to the separation process. And, as beta-isophorone is selectively removed by distillation, more of this beta is being formed from isophorone, further hindering the removal of phorone. Thus, the straightforward approach, i.e., to remove lower boiling impurities in a first distillation column and then separate isophorone from heavy ends in a second distillation column, becomes rather complicated and is further complicated by the fact that the separation of isophorone from the heavy ends is not an easy one, but requires a large number of theoretical plates along with a high vacuum, e.g., 25 mm. or less, to inhibit isomerization. Such a procedure then becomes uneconomical.

This invention, however, now permits isophorone to be produced in a substantially pure form without encountering the problems previously mentioned. Thus, it is now possible to prepare or purify isophorone at 98+%, preferably 99+% purity.

Summary of the invention

In accordance with this invention, therefore, exceedingly high purity isophorone can be recovered from a crude isophorone stream, from which the heavy ends have been removed, by distilling said crude stream and removing a substantially pure isophorone product from any point in the column below the feed. As will be described, the substantially pure isophorone can be recovered at any point below the feed, and preferably the lower the point of removal, i.e., the farther from the feed, the better will be the purity of the product, and also may be recovered as a vapor or a liquid product. Recovery of a vapor product is most preferred, however, since a liquid product will generally contain colored impurities. Nevertheless, liquid products can be simply flashed to complete the recovery of the substantially pure isophorone. (Recovery of the vapor product eliminates flashing, the stripping section of the column essentially serving as a flash.)

In another embodiment of this invention, the crude isophorone stream, from which the heavy ends have been removed, may be treated, either thermally or with an acidic catalyst, to cause the isomerization of beta-isophorone to isophorone, thereby increasing ultimate product yield.

Drawing description

A better understanding of this invention may be had by referring to the attached drawing which illustrates a typical embodiment of this invention. A crude isophorone stream produced, for example, by the base catalyzed condensation of acetone and comprised of the phorone and isophorone isomers, and light, medium, and heavy boiling impurities is fed by line 10 to a conventional distillation tower 11 operating at a bottoms temperature of about 100°–250° C., preferably about 175°–220° C., wherein the heavy ends are removed by line 12 as bottoms, an isophorone containing stream is removed overhead by line 13, condensed in condenser 14, and a portion of the overhead being removed by line 16, the remainder being recycled to column 11 by line 15. The isophorone containing stream recovered overhead will generally contain a greater amount of the beta-isomer than in the feed, due to the dynamic equilibrium properties previously mentioned. However, since the beta-isomer will be removed in the final distillation, some increase in its concentration can be tolerated here.

The isophorone containing stream 16 is then transferred to any suitable treating vessel 17 wherein the beta-isophorone is isomerized, e.g., by contact with an acidic catalyst such as phosphoric acid, to isophorone and the isophorone containing stream leaving vessel 17 by line 18 has a reduced beta-isophorone content. The stream in line 18 is then transferred to distillation column 19 operating at a bottoms temperature of about 220°–225° C. from which substantially pure isophorone can be recovered by several alternate procedures. The lighter components are taken overhead by line 20, condensed in condenser 21, a portion of which is removed from the system by line 23, the remainder being returned to the column by line 22. Now, the purified isophorone can be removed at any point below the feed to column 19. As previously discussed, the beta-isophorone is lighter boiling and will be preferentially removed overhead. Because of this, the residue in the columns will reequilibrate and more beta-isophorone will form. Thus, one can recognize that there will be an increasing concentration gradient of the beta-isomer as the top of the tower is approached. Conversely, the concentration gradient of the beta-isomer will decrease as the bottom of the tower is approached, and, substantially pure isophorone may be recovered at any point below the feed. Thus, in one alternative a vapor or liquid sidestream 24 may be removed from any point below the feed. A vapor sidestream will be of sufficient purity so that no additional operations are necessary. However, a liquid sidestream may have some colored impurities which require only a simple flashing operation wherein sidestream 24 is passed by line 34 into the flashing unit 35 from which an overhead (final product) stream is taken and a bottoms product 37 is withdrawn to reach the desired purity. As an alternative, the bottoms, line 25, is transferred to reboiler 26 and liquid stream 32 may be removed here as product and flashed similarly as liquid in line 24. As yet another alternative, the vapor from the reboiler can be split into two streams, line 27 which is a return to the column and line 28 which passes through demister 29 and from which purified isophorone is recovered via line 31. Solids or heavies separated in demister 29 are returned by line 30 to reboiler 26 from which heavy ends are removed by line 33 and may be recycled back to column 11. From the foregoing discussion, it is apparent that the purified isophorone can be removed as a vapor or liquid side stream or as a vapor or liquid from the reboiler, but when a liquid is recovered it is normally flashed to remove colored impurities. It is preferred to remove the purified isophorone as far below the feed as possible, more preferably from below the first plate or from the reboiler, and most preferably as a vapor.

As the terms are used herein, "sidestream" is any stream taken from the distillation column such as above or below the first plate, and "reboiler" encompasses any equipment through which the bottoms pass outside of the distillation column.

The final distillation, i.e., that occurring in column 19, may normally be conducted at subatmospheric pressures, e.g., as low as 25 mm. Hg, to superatmospheric pressures. A pressure of one atmosphere is preferred because of economic considerations. And, of course, selecting the pressure will generally fix the temperature. An important consideration, however, in the preparation of substantially pure isophorone is a relatively short residence time in the reboiler. Thus, the isophorone isomers have an equilibrium that favors the beta impurity at increasing temperatures, for example, the beta concentration at room temperature is about 0.1% while at 200° C. the beta concentration is about 2%. Since the isomerization to the beta impurity takes a finite period of time, the residence period in the reboiler should be minimized to prevent a beta buildup. Thus, reboiler residence times of less than about 8 hours are employed, preferably less than about 4 hours, and still more preferably less than about 1 hour.

The flashing operation is rather conventional and may be conducted at pressures ranging from 2 to 3 mm. Hg to 1 atmosphere. As with any such operation once the pressure is fixed the temperature is also fixed, e.g., 100–125 mm. Hg the temperature is about 100–115° C. Additionally, the same considerations regarding residence periods as in the final distillation must be taken into account. Thus, shorter residence periods are desirable to maintain product purity. By determining the kinetics of isophorone-beta-isophorone equilibrium, residence periods for various pressures and temperatures can be fixed at optimum levels.

In another embodiment of this invention, the ultimate yield of isophorone can be increased by treating the crude isophorone, from which heavy ends have been removed, to convert beta-isophorone to the desired product. This operation can be effected either thermally or catalytically. If catalytic conversion is employed, the catalyst may be any liquid or solid acidic catalyst, such as phosphoric acid, polyphosphoric acid, superphosphoric acid, other mineral acids, e.g., sulfuric acid, nitric acid, hydrochloric acid, organic acids, e.g., para-toluene sulfonic acids and sulfonic acids generally, trichloroacetic acid, monochloroacetic acid, silica, alumina, ion exchange resins, e.g., Amberlyst 15, sulfonic acid resins, acidic clays, e.g., attapulgas clay, aluminum silicate as in fuller's earth, and the like. When liquid catalysts are employed, a separator and/or neutralizer is also necessary to remove the catalyst. Thus, solid acidic catalysts are generally preferred and such catalysts as phosphoric acid impregnated kieselguhr, alumina, and ion exchange resins are still more preferred. This conversion can be effected over a large temperature range, i.e., 0°–250° C., preferably 75°–150° C. for periods ranging from about 5 minutes to 10 hours, preferably 15 minutes to 2 hours. Pressures are not critical and may vary widely, e.g., atmospheric to about 30 atmospheres.

The isomerization may also be effected thermally, i.e., without the aid of a catalyst, under similar conditions as those described except that the treating periods will be somewhat longer, i.e., about 5 to 30 hours, preferably about 5 to 15 hours. While increasing temperatures will increase the isomerization rate, the beta equilibrium concentration at higher temperatures also increases and cracking of the compounds, when exposed to temperatures over about 220° C. for extended periods, will be encountered.

Having now described the process, the following examples will further serve to illustrate this invention. However, no limitations, express or implied, are to be drawn from these examples since modifications and variations of the procedures shown herein will be obvious to those skilled in the art. This will be particularly true in the area of the distillation columns, where, depending upon the number of plates employed, reflux ratios, which are generally high in order to strip out impurities boiling close to isophorone, will vary and generally it is necessary to strike an economic balance between reflux ratio and column size. However, one skilled in the art using the normal tools of column design will experience no difficulty in arriving at a column suitable for his desired conditions. Also, it should be noted that the purification of isophorone, to obtain the high purity illustrated herein, is applicable for any process utilized to prepare the isophorone, since, regardless of the method of preparation, the dynamic equilibria of isophorone and beta-isophorone will exist.

Example 1

A feed containing isophorone and heavies was fed into a 40-plate tower at about 500 gallons per hour. The tower was operated about 200° C. at an overhead vacuum of about 100 mm. of Hg, and at a 2/1 reflux ratio. About 85% of the feed was recovered as overhead product. Considering only IPH and heavy ends present in the feed, the following product compositions were calculated:

COMPOSITION, WT. PERCENT

|  | α-IPH | β-IPH | Heavy Ends |
|---|---|---|---|
| Feed | 85.4 | Trace | 14.6 |
| Overhead | 97.4 | 2.4 | 0.2 |
| Bottom | 1.4 | Trace | 98.6 |

This example shows that taking finished isophorone as an overhead product from a fractional distillation, in a multiplate column, is not practical since β-IPH will form. Therefore, a new procedure was developed. This procedure involved first removing the heavy ends to produce what is presently called crude IPH, then removing the lights under suitable conditions to produce a relatively pure isophorone product. A discussion of the data, and examples of the new purification procedure follow.

Examples 2–7—40 and 60-plate topping distillations

The following tables of continuous examples show the effect of reflux ratio, plates, and percent overhead on product purity. (Unless otherwise specified, bottoms temperature was 220/225° C. throughout all following examples.)

TABLE I.—RESULTS OF 40-PLATE CONTINUOUS DISTILLATION

| Example | Percent overhead [1] | Reflux ratio | Stream | Composition, wt. percent | | | |
|---|---|---|---|---|---|---|---|
| | | | | IPH | β-IPH | Phorone | Others |
| | | | Feed [2] | 92.3 | 2.80 | 3.05 | 1.85 |
| 2 | ~10 | 18 | Product | 99.2 | 0.19 | 0.38 | 0.23 |
| 3 | ~10 | 35 | do | 99.5 | 0.11 | 0.14 | 0.25 |
| 4 | ~10 | 52 | do | 99.6 | 0.14 | 0.07 | 0.19 |
| 5 | ~15 | 35 | do | 99.5 | 0.19 | 0.02 | 0.29 |

[1] Percent of feed taken overhead.
[2] Based on this crude composition.

These examples show good results of distillations with a 40-plate column. Phorone is a key impurity, since it is highly colored. These examples also show the reduction of β-IPH in the bottom product.

TABLE II.—RESULTS OF 60-PLATE CONTINUOUS DISTILLATION

| Example | Percent overhead [1] | Reflux ratio | Stream | Composition, wt. percent | | | |
|---|---|---|---|---|---|---|---|
| | | | | IPH | β-IPH | Phorone | Others |
| | | | Feed [2] | 92.3 | 2.80 | 3.05 | 1.85 |
| 6 | 11 | 30 | Product | 99.6 | 0.20 |  | 0.20 |
| 7 | 9.5 | 50 | do | 99.6 | 0.15 |  | 0.25 |

See Table I for footnotes 1 and 2.

These results, when compared to the results from the 40-plate distillations, show that a 60-plate distillation produces a somewhat purer product at similar column conditions.

These examples show another way to reduce phorone in the bottoms without increasing the overhead, i.e., using more plates. Example 6 can be compared with Example 3. The percent overhead is about the same and the reflux ratios are close. However, in Example 6 the phorone has essentially been eliminated with 60 plates while it was only reduced to 0.14% with 40 plates.

Example 8

The following example shows the product produced from a 40-plate, 4-foot diameter tower.

Feed at ambient conditions was introduced into the ninth plate of a 40-plate tower at the rate of 500 gallons per hour. The tower was operated at atmospheric pressure with a reflux ratio of 35:1 and 18% of the feed was taken overhead. The feed and product compositions are shown below:

| | Composition, wt. percent | | | |
|---|---|---|---|---|
| | α-IPH | β-IPH | Phorone | Other |
| Feed | 88.0 | 1.90 | 2.6 | 7.5 |
| Bottom | 99.2 | 0.30 | 0.01 | 0.49 |
| Overhead | 14.3 | 31.8 | 14.5 | 39.4 |

Examples 9–10

A sidestream product can be taken either from the 40-plate or 60-plate column to produce a finished product of high α-isophorone and low phorone content, as shown by the following.

A 60-plate vacuum-jacketed Oldershaw column (1" I.D.) was set up for continuous operation. The feed was preheated to 180° C. and introduced to the column at plate 30 at a rate of 1.5 cc./min. The column was operated at atmospheric pressure and there was a 30 mm. pressure drop across the column. With a reflux ratio of 30:1, 10% of the feed was taken overhead, 23% was taken as bottoms, and the remaining 67% was taken as a vapor sidestream below plate 1. The feed and product compositions are shown below.

| | Composition, wt. percent | | | |
|---|---|---|---|---|
| | Feed | Overhead | Sidestream | Bottoms |
| IPH | 91.8 | 19.0 | 99.0 | 99.5 |
| β-IPH | 2.6 | 32.7 | 0.6 | 0.30 |
| Phorone | 3.0 | 30.0 | 0.02 | Trace |
| Other | 2.6 | 18.3 | 0.38 | 0.20 |

The vapor sidestream technique for purifying crude IPH was again demonstrated using a 40-plate valve tray column (4 ft. I.D.). The column was fed at a rate of 500 gallons/hour at the seventh plate. The column was operated at atmospheric pressure and with a reflux ratio of 50:1. About 15% of the feed was taken overhead, and the remainder was taken as a bottoms product, which was subsequently flashed. In order to demonstrate the vapor sidestream technique, frequent vapor samples were taken at plate 1. A set of analyses is shown below.

| | Composition, wt. percent | | | |
|---|---|---|---|---|
| | Feed | Overhead | Sidestream [1] | Bottoms [2] |
| IPH | 90.6 | 30.6 | 99.6 | 99.6 |
| β-IPH | 4.87 | 45.17 | 0.13 | 0.10 |
| Phorone | 1.61 | 9.62 | 0.01 | 0.01 |
| β-Phorone | 0.54 | 2.98 | 0.01 | 0.01 |
| Others | 2.42 | 11.7 | 0.27 | 0.31 |

[1] Clear, water white.
[2] Slightly colored, but easily cleaned up by flashing.

Examples 9 and 10 clearly indicate the extremely high purity IPH that can be recovered by this process. The well-known Feuske equation can be used in accordance with the data herein to design a suitable distillation column.

The following examples illustrate the effect of residence time during the topping distillation and during the flash distillation.

Examples 11-12

These examples show the effect of residence time on product purity. Feed rate, reflux ratio, percent taken overhead are held constant while the holdup in the distillation unit is varied.

PARAMETERS HELD CONSTANT

| | |
|---|---|
| Feed rate, g.p.h. | 550 |
| Bottom rate, g.p.h. | 475 |
| Reflux ratio | 35/1 |
| Overhead, vol. percent | 18 |

Feed composition, wt. percent: α-IPH, 88.0; β-IPH, 1.9; Phorone, 2.6; Others, 7.5.

This feed was fed to a 40-plate column. In the first test the bottoms holdup was 600 gallons. In the second test the holdup was decreased to 400 gallons. The resulting product purities from the topping distillation are shown in Table III.

PARAMETERS

| | |
|---|---|
| Temperature, °C. | ~200 |
| Pressure, mm. Hg | 100 |
| Plates | 40 |
| Reflux ratio | 2/1 |
| Feed rate, g.p.h. | 600 |
| Overhead rate, g.p.h. | 500 |
| Bottoms rate, g.p.h. | 100 |

| Feed composition: | Percent |
|---|---|
| Lights | 7 |
| α-isophorone | 73 |
| Heavy ends | 20 |
| Overhead (crude IPH): | |
| Lights | 9.6 |
| α-IPH | 90.2 |
| Heavies | 0.2 |
| Bottom | |
| α-IPH | 2 |
| Heavy ends | 98 |

This distillation is a straightforward isophorone distillation to remove heavy ends and is a conventional procedure. The overhead is then processed as described in this invention.

TABLE III.—EFFECT OF BOTTOM RESIDENCE TIME ON PRODUCT PURITY

| Example | Bottom holdup, gal. | Residence time hr.[1] | Product composition, wt. percent | | | |
|---|---|---|---|---|---|---|
| | | | IPH | β-IPH | Phorone | Others |
| 11 | 600 | 1.3 | 99.0 | 0.47 | 0.01 | 0.52 |
| 12 | 400 | 0.85 | 99.2 | 0.30 | 0.01 | 0.49 |

[1] Holdup divided by bottoms product rate.

This data shows that decreased residence periods increase isophorone purity.

Examples 13-15

The following examples show the effect of residence time in the flash unit on finished product purity.

PARAMETERS HELD CONSTANT

| | |
|---|---|
| Feed rate, g.p.h. | 1500 |
| Product rate, g.p.h. | 1450 |
| Bottoms purge, g.p.h. | 50 |
| Percent overhead | ~96 |
| Pressure, mm. Hg | ~100 |

Feed composition,[1] wt. percent: α-IPH, 99.2; β-IPH, 0.30; Phorone, 0.01; Others, 0.49.

[1] Dark colored bottom product from 40-plate tower.

Three tests were performed in a flash unit at about 100°–115° C. and 100–125 mm. Hg. In the first test, the bottoms holdup was about 600 gallons; the second test, about 400 gallons; and the third test, about 250 gallons. The resulting product purities are shown in Table IV.

Example 17

This example illustrates the thermal and catalytic isomerization of beta-isophorone to alpha-isophorone at various temperatures and with various catalysts. Results are shown in Table V.

TABLE V

| Temperature (°C.) | Catalyst | Time (hours) | Concentration of β-isophorone (percent)[1] | |
|---|---|---|---|---|
| | | | Initial | Final |
| 25 | PPA [2] | 18 | 95.9 | 5.65 |
| 150 | PPA | 0.3 | 5.3 | 0.95 |
| 93 | Alumina [3] | 2.5 | 5.3 | 0.40 |
| 150 | do | <0.1 | 4.4 | 0.75 |
| 211 | None | 28.6 | 5.3 | 1.7 |
| 207 | do | 12.3 | 94.8 | 1.5 |

[1] Determined by gas chromatography on a 10 ft. carbowax 20 M, 5% on chromosorb A-W column at 140° C.
[2] Phosphoric acid catalyst.
[3] Acid washed alumina.

What is claimed is:

1. A process for purifying isophorone which com-

TABLE IV.—EFFECT OF BOTTOM RESIDENCE TIME ON PRODUCT PURITY

| Example | Bottom holdup, gal. | Residence time hr.[1] | Product composition, wt. percent | | | |
|---|---|---|---|---|---|---|
| | | | IPH | β-IPH | Phorone | Others |
| 13 | 600 | 0.40 | 98.4 | 0.78 | 0.01 | 0.81 |
| 14 | 400 | 0.27 | 98.7 | 0.56 | 0.01 | 0.73 |
| 15 | 250 | 0.17 | 99.0 | 0.43 | 0.01 | 0.46 |

[1] Holdup divided by feed rate.

Table IV shows that low residence time is important in the flash step to keep β-IPH content low in the overhead (final product) stream.

Taking a vapor sidestream, however, during the topping distillation would eliminate the need for a flash distillation, prevent β-IPH formation, and result in a purer product.

Example 16

This is an example of the first distillation to remove the heavies from crude IPH.

prises subjecting a crude isophorone stream comprising isophorone, beta-isophorone, phorone, beta-phorone, lighter boiling impurities and heavier boiling impurities to distillation in a first distillation column to separate heavier boiling impurities as a bottoms product and recovering an overhead product comprising isophorone, beta-isophorone, phorone, beta-phorone, and lighter boiling impurities, subjecting the overhead product to distillation in a second distillation column, and recovering a substantially purified isophorone from a point in the second column below that at which the feed is introduced into the second column, said first and second distillation columns being operated without the addition of an alkali hydroxide catalyst to said distillation columns.

2. The process of claim 1 wherein the purified isophorone is recovered as a liquid.

3. The process of claim 2 wherein the liquid isophorone is subjected to flashing at pressures no greater than about one atmosphere.

4. The process of claim 1 wherein the liquid isophorone is recovered as a sidestream from the second distillation column.

5. The process of claim 1 wherein the liquid isophorone is recovered from the second distillation column reboiler.

6. The process of claim 1 wherein the purified isophorone is recovered as a vapor.

7. The process of claim 6 wherein the vaporous isophorone is recovered as a sidestream from the second distillation column.

8. The process of claim 6 wherein the vaporous isophorone is recovered from the second distillation column reboiler.

9. The process of claim 1 wherein both the first and second distillation columns are at pressures no greater than about one atmosphere.

10. The process of claim 1 wherein the second distillation column reboiler residence is less than about 8 hours.

11. The process of claim 9 wherein the feed to the second distillation column is treated prior to entry into the second distillation column by contacting the feed with an acidic catalyst at temperatures of about 75° to 150° C. in order to isomerize beta-isophorone to the desired isophorone product.

12. The process of claim 11 wherein the catalyst is comprised of phosphoric acid.

13. The process of claim 11 wherein the catalyst is alumina.

14. The process of claim 1 wherein the feed to the second distillation column is thermally treated prior to entry into the second distillation zone at temperatures of 75° to 150° C. for a period of about 5 to 30 hours in order to isomerize beta-isophorone to the desired isophorone product.

References Cited

UNITED STATES PATENTS

| | | | |
|---|---|---|---|
| 2,337,489 | 12/1943 | Patterson | 203—81 |
| 2,425,752 | 8/1947 | McKenna et al. | 203—88 |
| 2,672,434 | 3/1954 | MacFarlane | 203—74 |
| 2,813,134 | 11/1957 | Johnson | 203—81 |
| 2,871,169 | 1/1959 | Martin | 203—81 |
| 2,968,677 | 1/1961 | Fewlass | 260—586 |
| 3,031,384 | 4/1962 | Sirois et al. | 203—98 |
| 3,041,378 | 6/1962 | Craven et al. | 260—586 |
| 3,140,243 | 7/1964 | Feder et al. | 203—81 |
| 3,337,423 | 8/1967 | Schmitt et al. | 260—586 |
| 3,337,632 | 8/1967 | Schmitt et al. | 260—586 |

WILBUR L. BASCOMB, JR., Primary Examiner

U.S. Cl. X.R.

203—29, 33, 34, 35, 38, 74, 77, 81, 88, 99; 260—586